(12) United States Patent
Blok et al.

(10) Patent No.: US 6,863,171 B2
(45) Date of Patent: Mar. 8, 2005

(54) DEVICE FOR DISCHARGING PRODUCTS FROM A CONVEYOR SYSTEM

(75) Inventors: Peter Blok, Hellevoetsluis (NE); Henricus Nicolaas Johannes De Jong, Delft (NE)

(73) Assignee: B.V. Machinefabriek Houdijk, Vlaardingen (NL)

( * ) Notice: Subject to any disclaimer, the term of this patent is extended or adjusted under 35 U.S.C. 154(b) by 0 days.

(21) Appl. No.: 10/165,416

(22) Filed: Jun. 7, 2002

(65) Prior Publication Data

US 2003/0010601 A1 Jan. 16, 2003

(30) Foreign Application Priority Data

Jun. 26, 2001 (NL) .............................................. 1018391

(51) Int. Cl.[7] .............................................. B65G 47/10
(52) U.S. Cl. .............................. 198/370.08; 198/370.07; 198/370.02
(58) Field of Search ....................... 198/370.08, 370.07, 198/370.02, 370.11, 428

(56) References Cited

U.S. PATENT DOCUMENTS 4,773,524 A * 9/1988 Greeves ....................... 198/428
5,322,152 A * 6/1994 Tommila et al. ............ 194/212

* cited by examiner

*Primary Examiner*—Christopher P. Ellis
*Assistant Examiner*—Rashmi Sharma
(74) *Attorney, Agent, or Firm*—Ladas & Parry

(57) ABSTRACT

The invention relates to a device for blowing or pushing products from a conveying member, to which end a number of spaced-apart members are employed, each being provided with a controllable air valve, or with sliding parts with a controllable driving mechanism which are mounted on an endless conveyor, belt or chain. Further, a control system has been provided in which detection members determine whether a product meets set quality requirements and when and by which member the approved products should be blown or pushed from the conveying member in such a way that the products are successively brought in predetermined arrangements or patterns.

14 Claims, 3 Drawing Sheets

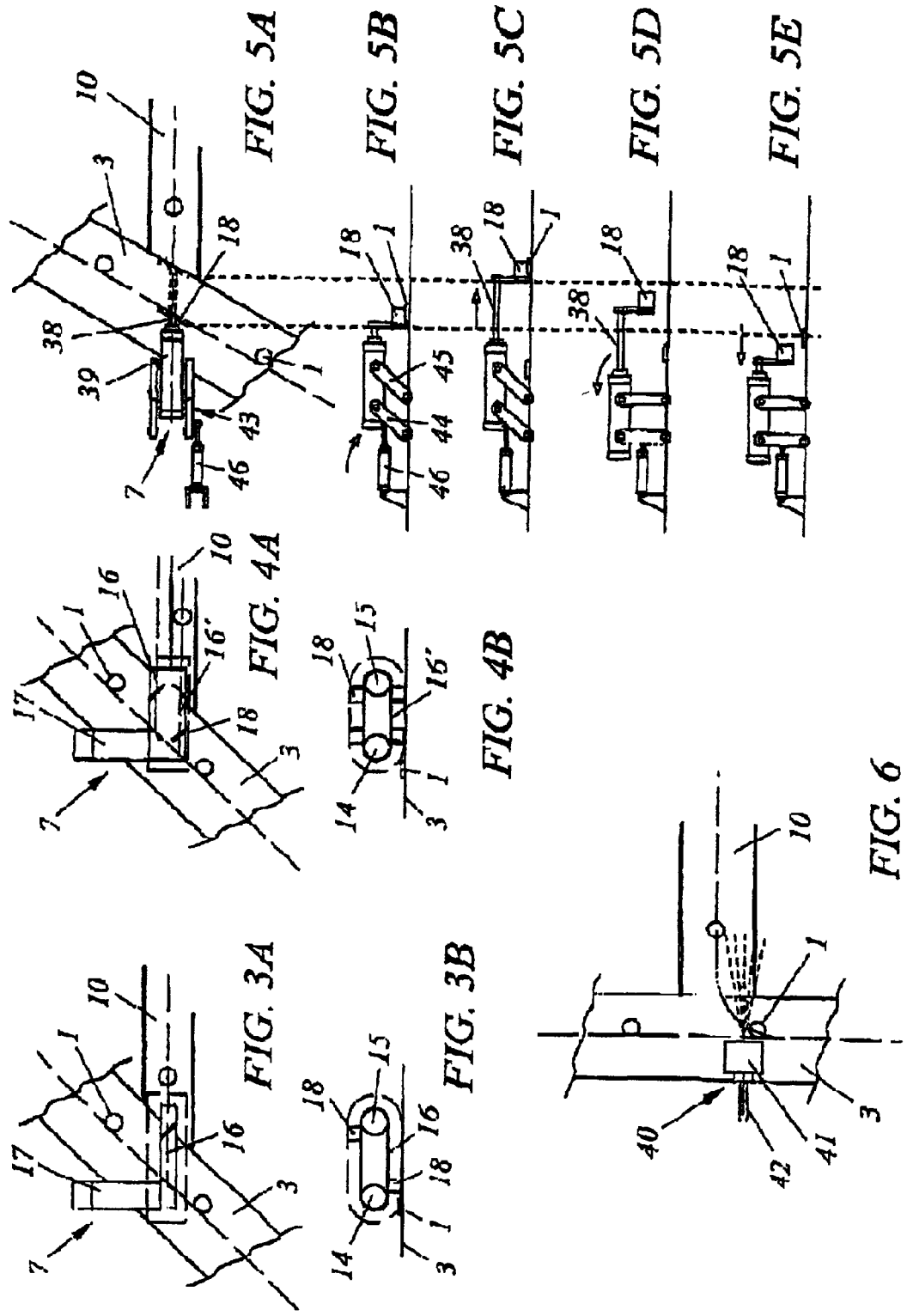

DEVICE FOR DISCHARGING PRODUCTS FROM A CONVEYOR SYSTEM

The present application relates to a device by means of which a certain amount of products can be removed from one single stream of supplied products. The products to be removed can be of a variety of natures, in which, however, it should also be possible to process more or less vulnerable products such as e.g. products from the foodstuffs industry in this way.

Such devices are known per se, however, they often have a relatively complicated structure and are therefore expensive and furthermore have a relatively limited processing speed.

The object of the invention is to provide a device having a simple structure with which high processing speeds are possible without any risk of damaging vulnerable products, such as e.g. biscuits and related articles. Accordingly, the invention provides a device for enabling selective discharge of products from one single stream of products supplied by a conveying member, means being provided for the conveying direction in a number of predetermined locations, and further a control system being provided for controlling said means, in which the control system is arranged such that the products can selectively be given a movement in another direction than the conveying direction.

The movement given to said products is such that they can be removed from the conveying member and can be supplied to a further conveying member, receiving member or processing member in a certain arrangement.

According to the invention, a number of different embodiments of said means are provided, by which the products can be discharged from the conveying member. A first embodiment comprises a number of spaced-apart air members intended for dispensing an air jet at points in time indicated by the control system. With such an air jet, e.g. pressurized air jet, it is well possible to blow a specific product away from the supply towards a subsequent member also in case of a relatively high supplying speed.

Additionally, the invention provides for embodiments in which the means are provided with a pushing part being intended for directly contacting a product and by which the product is pushed from the conveying member. According to a second embodiment, said means comprise a number of pneumatic or hydraulic cylinders, which are controlled by the control system, in which each cylinder is provided with at least one pushing part. According to a third embodiment, said means comprise a number of members each having a frame with at least one endless conveyor, belt or chain mounted on it, a driving member for driving it, with at least one pushing part being mounted on each conveyor, belt or chain and said control system providing for the control of the driving members.

In order to prevent the products from getting damaged on engagement of said products by said means, it has been provided for that the means have been designed in such a way, that the products are engaged with a small force at least initially. To this end, it has been provided for, that the products are led along the pushing parts at a small distance so that they will come to abut the pushing parts from the start of their acceleration. When applying the air members, the products are also led closely along the nozzles of the air members in which the diffusion of the air jet extends across at least part of the near side of a product led along it.

In all embodiments, individual products are discharged from the conveying member. Combined with a control system programmable at will, this provides for that products can be transferred to e.g. a subsequent conveying member in almost any possible arrangement or pattern. Specific arrangements can be a solution for certain purposes.

The most common arrangement of the products removed from the conveying member will be an arrangement in a row. Here, a row of products should be understood to mean not only a group of products exactly aligned, but also products which are not necessarily aligned, but can be distinguished from a subsequent row or unit of products as an independent linear unit. Products in such a row can then be aligned in a simple way with further means or receiving members.

Although with the individual embodiments per se it is possible, in case of a continuous supply of products with exactly identical spacing, to push the products away in a line, in case of an obvious variation in the mutual distances in practice this will mostly not be possible. A slight difference in mutual distances may possibly be overcome by providing the individual members of each of the embodiments with a sufficiently large range.

However, in case of an unequal spacing of the products in the supply, the invention also intends to push them away without the operating range of the members having to be adapted for that purpose and in which after the blowing or pushing off, a row of products with the desired spacing is achieved. To this end, it has been provided for, that at least one detecting member is coupled to the control system for actuating the driving members, by means of which the position of a product can be determined in at least one point in time. With a given speed of supply of the products, the position of each individual product in time will then be known and an air member or pushing member can be actuated on exactly the appropriate point in time.

Here, not of one single product, but the point in time of each product in the stream of subsequent products is determined, in which the operating system determines when which product(s) should be pushed off, and for each product which air member or pushing member will realize this. In this way, repeatedly series of products can be pushed off more or less simultaneously. More or less simultaneously sliding off a row can e.g. also mean that a first series and a second series are pushed off shortly after one another, in which there may be time differences within the first and second series of pushing off, due to differences in mutual distances between the products. The result is always that a row is formed with the products having equal mutual spacings, which however are not aligned exactly.

Here, preferably it is also provided for that at least one detecting member is arranged to determine the appearance of the products. Said member can determine whether or not a product meets quality requirements set. With the device according to the invention it is then possible to have a product which does not meet the quality requirements set move along without being blown or pushed off. By selectively actuating and non-actuating the members with the products before and behind a disapproved product, it is possible to form a row in which the row is constituted with products not all having been blown or pushed off on approximately the same point in time, but in which the products will end up at mutually equal spacings and a sufficiently large distance to a subsequent row is achieved for working with successive rows in further processing.

The invention provides for means for aligning the products discharged from the conveying direction on a connecting conveyor belt. According to a further elaboration, the means comprise one or more receiving members being able to receive at least a number of products from products distributed across the width of the conveyor belt and to dispense them in one line.

Since blowing or pushing off the products occurs during their supply, it is provided for, in order to be able to perform the pushing off in the best possible controlled manner, that the device is arranged such in relation to a product supply that the direction of supply of the supplied products is across an angle to the imposed direction of movement in the range of 45° 160°, and preferably in the range from 90°–135°.

The invention is further explained by way of an example given in the drawing, in which.

FIGS. 3A,B illustrate schematically a pushing member with one single driven belt;

FIGS. 4A,B illustrate schematically a pushing member with two simultaneously driven belts;

FIGS. 5A-E illustrate schematically a pushing member in a number of subsequent positions in which a pushing part is actuated with a cylinder; and FIG. 6 illustrates schematically an air member.

Figure 1:
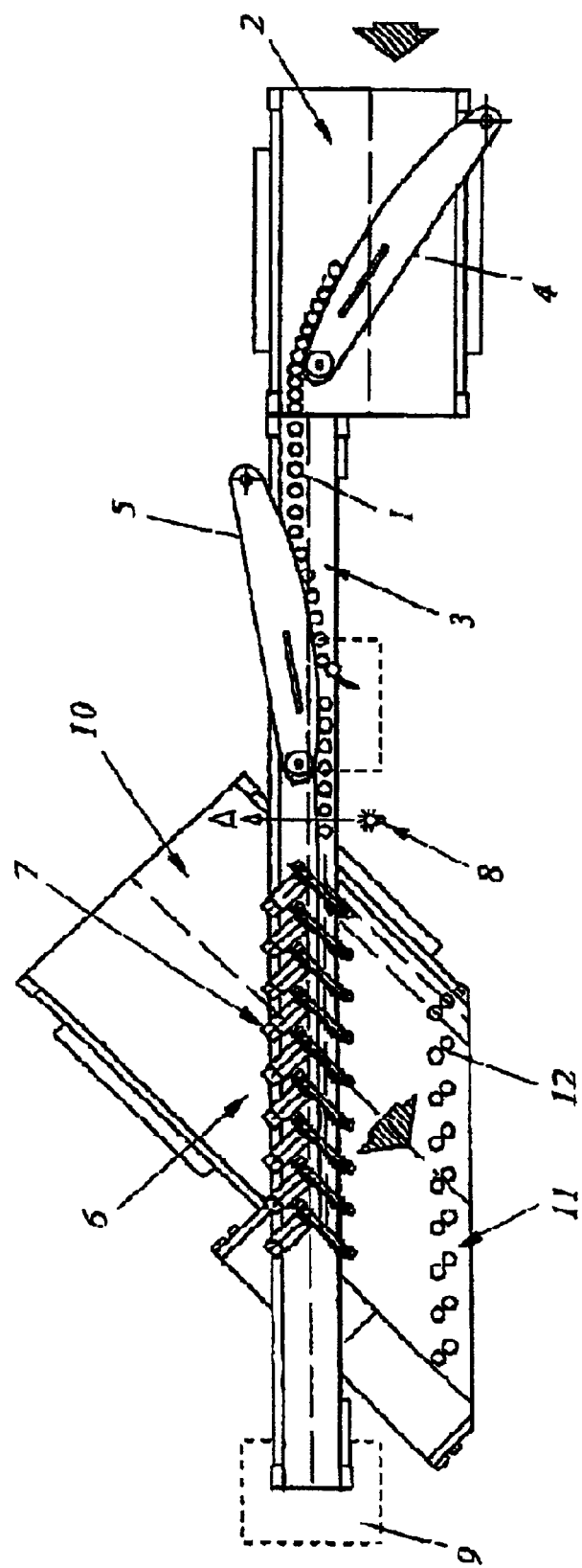
FIG. 1 illustrates a plan view of a first arrangement of a product supply having a number of pushing members.

FIG. 1 shows a plan view of a supply system for products 1, with a first supply belt 2 and a second supply belt 3 connecting to it. The products 1 are supplied in a non arranged way on the first supply belt 2 and at the end of it, they are forced into one single stream of products with the help of a guide or auxiliary belt 4. The stream of products is subsequently formed into a stream of substantially spaced-apart products 1 on the second supply belt 3 by a further auxiliary belt 5 running at a slightly higher speed than the supply belt 3.

Here, the most important aspect is in fact that the products will end up in one line as much as possible and in that condition can be led to the device 6 with pushing members 7 which is situated above the second supply belt 3. It is not always necessary that the products will be spaced-apart. In practice, abutting products have proven not to present any difficulty.

Preceding the pushing members 7, detecting means 8 have been mounted, comprising at least one detecting member which can determine the exact moment in which a product passes that point. Through this, it is known when and where each product will be situated on the second supply belt 3 and the pushing members can be actuated depending on that. Preferably the detecting means a also comprise means or a separate detecting member than can check if the quality of the passing products meets the requirements act.

If a product does not meet the requirements, the control system of the device, not further illustrated in the drawing, can have the disapproved products continue moving on the supply belt 3 by actuating the pushing members 7 selectively in time. At the end of the second supply belt 3 there is a receptacle 9, positioned for received such disapproved products.

Having disapproved products continue moving and forming a row of products from the good products situated in front of and behind it with proper mutual spacings is only possible by the capability of selectively driving the pushing members 7 and exactly knowing the position of the products in time. By selectively and therefor not simultaneously pushing the products off, the row formed in this way will mostly not be a row in which the products are exactly in one line, but it will be formed in such a way that it can be distinguished as a row from a next pushed-off row. The time differences between pushing-off the separate products together constituting a row are obviously smaller than the time difference between subsequent rows.

In the figure, the products 1 are pushed-off to a conveyor belt 10 being at an angle greater than 90° to the supply belt and being parallel to the direction of pushing-off by the pushing members 7. The products are pushed-off from the second supply belt 3 across an angle, in the figure of approximately 135°, in which the sliding parts 18, which comprise substantially a plate-shaped body, are approximately parallel to the supplying direction of the supply belt 3, in order to be able to control the push-off movement in the best possible way.

On the conveyor belt 10, a row 11 established after pushing off is schematically indicated, which seems to consist of pairs of products 12. Seen in the direction transverse to the conveyor belt 10, the products are at mutually exactly equal distances. The formation shown arises by the use of two parallel belts with pushing off parts per pushing member 7 or one belt with laterally projecting pushing-off parts mutually offset, pushing-off rows of intermediate products in turn.

When having to have disapproved products continue, the appearance of the row will become more irregular, however, the intended spacing will remain the same and the distance to a following row will remain sufficiently large to be able to maintain the distinction between subsequent rows.

Connecting to the conveyor belt 10 a further conveying or receiving member can be mounted where the row is transferred onto it or into it, and further means for forming e.g. a row into which the products of a pushed-off row will end up in one line, or the products of a pushed-off row can be brought into individual rows parallel to the conveying direction of the conveyor belt 10. In both cases, it is important that the pushed-off products will be provided with an identical mutual spacing transverse to the supplying direction and in rows which can be distinguished from one another.

Figure 2:
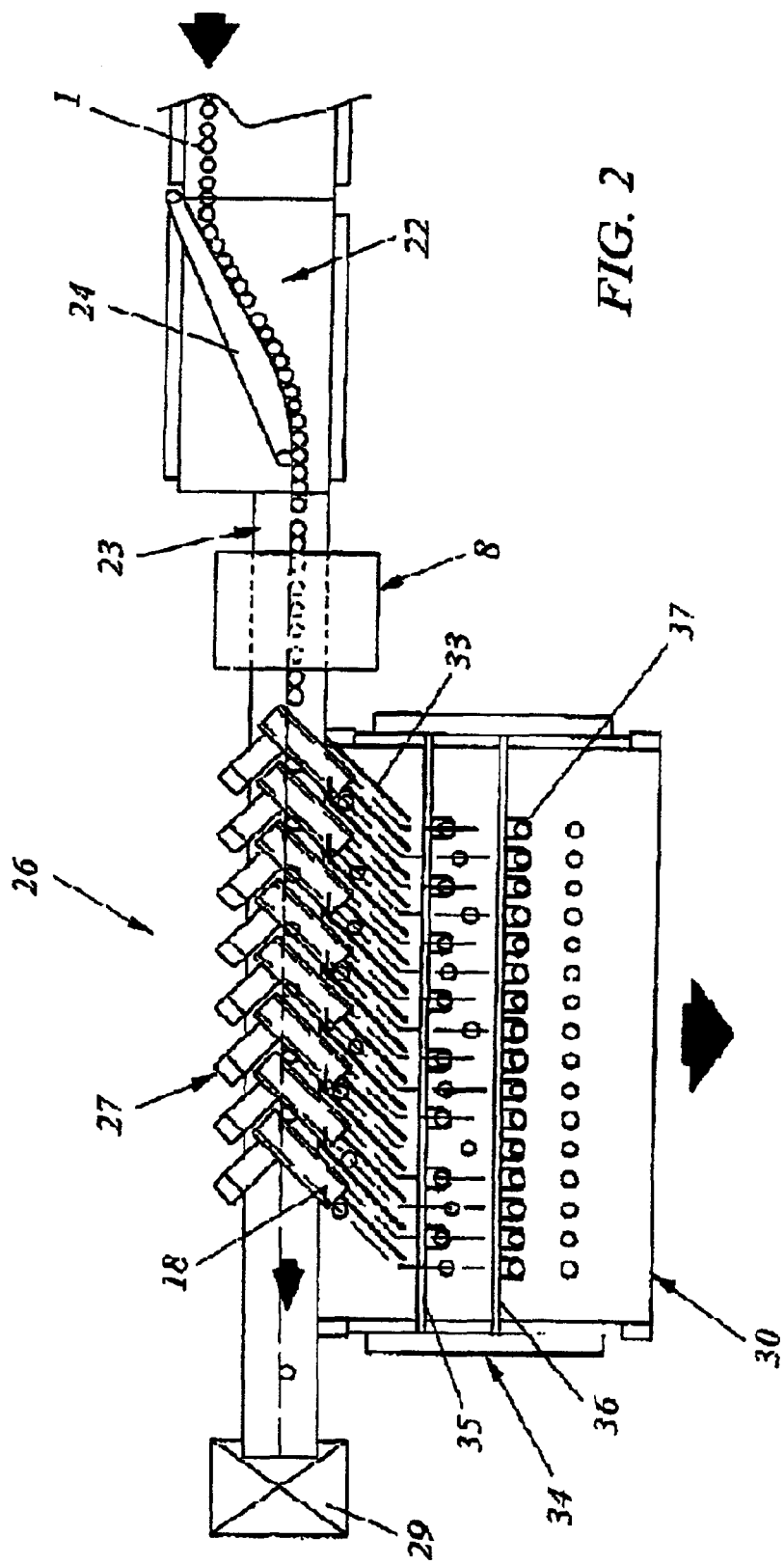
FIG. 2 illustrates a plan view of a second arrangement of a product supply having a number of pushing members.

FIG. 2 also shows a plan view of a supply system for products 1 having a first supply belt 22, a second supply belt 23, a single auxiliary belt 24, detecting means 28 and a push-off device 26 with push-off members 27. The products 1 are brought in a single stream with one single auxiliary belt 24. The push-off members 27 transfer the products onto a conveyor belt 30 which is situated across an angle of 90° to the conveyor belt 23 here.

The push-off members 27 have two driven belts 16, 16', each provided with a number of sliding parts 18 (see also FIGS. 4A,B). Connecting to the push-off members, guides 33 have been mounted, which see to it that the products 1 will definitely end up at the appropriate position in the width of the conveyor belt 30. By these guides, it is also possible to have the conveyor belt 30 extend across an angle of 90° in relation to the supply conveyor 23.

Further, a device 34 for aligning products 1 is mounted above conveyor belt 30. The device is provided with two arms 35, 36 having receiving elements 37. These arms 35, 36 can receive products until half a row and a complete row, respectively, has been formed, and which will then be released. Through this, irregularities in the supply as a consequence of e.g. disapproved products, will be overcome and it is easy to form rows of products in which the products are exactly in one line.

FIGS. 3A,B illustrate schematically plan and side views of a push off member 7 with one single belt 16, with sliding parts 18 mounted on it, and a driving member 17 for the belt 16. A sliding part 18 is positioned such in relation to the supply belt 3, 23 that it lies directly along the path of the products 1. Through this, it is achieved that on actuating the push-of member 7 the sliding part 18 already contacts the product of will abut it at a relatively low speed, so that the product can not get damaged. Given the desired driving speed and the accurate positioning, driving member 17 can be e.g. a step motor, servo motor or electric motor having an operable frequency control.

FIGS. 4A,B illustrate schematically plan and side views of a push off member 7 with two belts 16, 16' being simultaneously driven by one single driving member 17. In this embodiment, it is possible to get two adjacent products in a row or another desired arrangement by means of one push-off member 7.

FIGS. 5A–E illustrate in a number of subsequent positions plan and side views of a push-off member 7 substantially comprising a hydraulically or pneumatically driven assembly of piston 38 and cylinder 39, in which said sliding part 38 is mounted directly to said piston 38. A device with these push-off members can also be actuated easily and quickly.

The cylinder 30 is incorporated in a parallelogram structure 43 having leg sets 44, 45 in which a cylinder 46 engages a leg of the rearward leg set 44. In FIG. 5B, the assembly of piston 38 and cylinder 39 is in a first position in which sliding part 18 can directly engage a passing product 1. After pushing-off product 1 in FIG. 5C, the assembly of piston 38 and cylinder 39 is brought into a second position with the help of structure 43 and cylinder 46, see FIG. 5D, in which the sliding part 10 projects beyond the supply belt 3 and products 1 located on it. In this position, piston 38 can be retracted with sliding part 18 without the risk of hitting a passing product 1, see FIG. 5E. From this second position, the assembly of piston 38 and cylinder 39 can be returned to the first position according to FIGS. 5A,B and then the sliding part 18 will be positioned appropriately again for pushing-off a next product 1.

Except for this structure, there are further possibilities to return the sliding part 18 free from products to the original position, in which e.g. a hinge mechanism can be contemplated, for bringing the sliding part 18 from a vertical position to a horizontal position and vice versa.

FIG. 6 illustrates a plan view of an air member 40 substantially comprising an operable air valve 41 and a supply duct 42 for pressurized air connected to it. With this member, the product 1 is brought from the supply belt 3 to a further conveyor belt 10 by means of an air jet. Such a member too can be actuated particularly easily and quickly.

What is claimed is:

1. Device for enabling selective discharge of products from one single stream of the products supplied by a supply conveying member to a discharge conveying member, the discharge conveying in member having a direction of transport at an angle with respect to a transport direction of the supply conveying member, the device comprising a plurality of spaced apart transfer members to transfer the products from the supply conveying member to the discharge conveying member.

a control system for controlling the transfer members such that the transfer members can selectively be actuated to transfer products to the discharge conveying member, first detection means alone the supply conveying member for providing the control system a time of each of the products passing the first detection means, second detection means for detecting and providing the control system a quality of each of the products, characterized in that each of the transfer members comprises a frame with at least one endless conveyor, belt or chain, a driving member for driving the endless conveyor, belt or chain, and at least one pushing part on the endless conveyor, belt or chain, wherein the control system controls the driving member.

2. Device according to claim 1, characterized in that two of the endless conveyors, belts or chains are parallel to one another, driven synchronously and each provided with a number of sliding parts offset in relation to one another.

3. Device according to claim 1, characterized in that two of the endless conveyors, belts or chains are parallel to one another, provided with a number of sliding parts, and driven separately.

4. Device according to claim 1, characterized in that the control system controls the driving member for movement such that a sliding part of the endless conveyor, belt or chain has a predetermined position in relation to the supply conveying member at the start of the movement.

5. Device according to claim 1, characterized in that the driving member is a step motor, servo motor or electric motor having an operable frequency control.

6. Device according to claim 1, characterized in that the transfer members comprise a number of pneumatic or hydraulic cylinders each provided with at least one pushing part.

7. Device according to claim 6, characterized in that each of the pneumatic or hydraulic cylinders can be brought into a first and a second position in relation to a plane in which the products are supplied, the first position being for a sliding part of the endless conveyor, belt or chain to engage one of the supplied products and the second position being for the sliding part to be above the plane and above the supplied products.

8. Device according to claim 7, characterized in that each of the pneumatic or hydraulic cylinders is incorporated in a parallelogram structure having a leg for engaging an actuating member.

9. Device according to claim 1, characterized in that the transfer members are designed such that the products are engaged with a small force at least initially.

10. Device according to claim 1, characterized in that the transfer members impose a direction of movement on the products at an angle in a range of 45°–160° to the transport direction of the supply conveying member.

11. Device according to claim 10, characterized in that the range extends from 90–135°.

12. Device according to claim 1, characterized in that guides for the products having been discharged from the supply conveyor have been provided, by which the products end up at a further conveying or processing member in a fixed trajectory.

13. Device according to claim 1, characterized in that means have been provided which are arranged for bringing the products discharged from the supply conveyor in one line on a connecting conveyor belt.

14. Device according to claim 6, characterized in that said means comprise one or more receiving members being able to receive at least a number of the products distributed across the width of the conveyor belt and to dispense them in one line.

* * * * *